US012742138B2

(12) United States Patent
Wada et al.

(10) Patent No.: US 12,742,138 B2

(45) Date of Patent: Sep. 22, 2026

(54) CLEANING LIQUID AND METHOD FOR CLEANING SUBSTRATE

(71) Applicant: TOKYO OHKA KOGYO CO., LTD., Kawasaki (JP)

(72) Inventors: Yukihisa Wada, Kawasaki (JP); Kohei Serizawa, Kawasaki (JP); Choitsu Go, Kawasaki (JP); Kazumasa Wakiya, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 549 days.

(21) Appl. No.: 18/061,617

(22) Filed: Dec. 5, 2022

(65) Prior Publication Data

US 2023/0203409 A1 Jun. 29, 2023

(30) Foreign Application Priority Data

Dec. 28, 2021 (JP) ................................ 2021-214865

(51) Int. Cl.

| | |
|---|---|
| ***C11D 17/00*** | (2006.01) |
| ***C11D 1/04*** | (2006.01) |
| ***C11D 1/40*** | (2006.01) |

(52) U.S. Cl.

CPC ............ *C11D 17/0008* (2013.01); *C11D 1/04* (2013.01); *C11D 1/40* (2013.01); *C11D 2111/16* (2024.01)

(58) Field of Classification Search

CPC ......... C11D 17/0008; C11D 1/04; C11D 1/40; C11D 2111/16; C11D 3/2086;

(Continued)

(56) References Cited

U.S. PATENT DOCUMENTS 4,968,398 A * 11/1990 Ogasawara ............ G03F 7/425 205/661

5,846,695 A * 12/1998 Iwata ............... H01L 21/31133 257/E21.255

(Continued)

FOREIGN PATENT DOCUMENTS

CN 111381459 A * 7/2020 ............ G03F 7/425

EP 578507 A2 1/1994

(Continued)

OTHER PUBLICATIONS

Sun et al. (CN-111381459-A, Machine Translation) (Year: 2026).*

Office Action issued in U.S. Appl. No. 18/061,606, dated Apr. 23, 2025, in 17 pages.

*Primary Examiner* — Binh X Tran

*Assistant Examiner* — Christopher Remavege

(74) *Attorney, Agent, or Firm* — Knobbe Martens Olson & Bear LLP

(57) ABSTRACT

A cleaning liquid for cleaning a substrate having a first metal atom-containing layer that contains ruthenium and a second metal atom-containing layer that contains a metal atom other than ruthenium, both of the layers contacting each other, and at least one of the first metal atom-containing layer and the second metal atom-containing layer is exposed on a surface. The cleaning liquid includes at least one of a compound represented by General Formula (a1), a hydrate of the compound, and a salt of the compound, and at least one amine other than the hydrazine compound and a quaternary hydroxide. In General Formula (a1), $R^1$ and $R^2$ represent an organic group including no carbonyl group or a hydrogen atom (Continued)

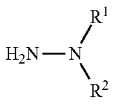

(a1)

16 Claims, 2 Drawing Sheets

(58) Field of Classification Search
CPC ......... C11D 3/0073; C11D 3/30; C11D 3/044; C11D 3/2075; C11D 3/43; C11D 7/3209; C11D 7/3218; C11D 7/5004; C11D 2111/22; G03F 7/425; H01L 21/31133
See application file for complete search history.

(56) References Cited

U.S. PATENT DOCUMENTS

| | | | | |
|---|---|---|---|---|
| 5,981,454 | A * | 11/1999 | Small | C11D 3/43 134/40 |
| 6,103,680 | A * | 8/2000 | Honda | H10P 70/273 134/1.1 |
| 6,326,130 | B1 | 12/2001 | Schwartzkopf et al. | |
| 6,440,326 | B1 * | 8/2002 | Maruyama | G03F 7/425 257/E21.255 |
| 6,546,939 | B1 * | 4/2003 | Small | C11D 3/2086 438/692 |
| 6,585,825 | B1 * | 7/2003 | Skee | C11D 3/33 257/E21.228 |
| 7,951,765 | B2 | 5/2011 | Kim | |
| 2002/0077259 | A1 * | 6/2002 | Skee | H10P 70/234 134/28 |
| 2003/0083215 | A1 * | 5/2003 | Lee | C11D 3/43 510/499 |
| 2005/0202987 | A1 * | 9/2005 | Small | G03F 7/426 257/E21.255 |
| 2006/0008925 | A1 * | 1/2006 | Takashima | H01L 21/02068 438/1 |
| 2006/0040838 | A1 * | 2/2006 | Shimada | C11D 3/042 257/E21.309 |
| 2008/0004197 | A1 * | 1/2008 | Kneer | C23G 1/103 134/2 |
| 2009/0082240 | A1 * | 3/2009 | Nukui | G03F 7/425 510/176 |
| 2009/0140202 | A1 * | 6/2009 | Takahashi | C11D 7/3209 252/188.28 |
| 2010/0152086 | A1 * | 6/2010 | Wu | C11D 3/43 510/175 |
| 2012/0048295 | A1 * | 3/2012 | Du | H01L 21/02071 134/3 |
| 2012/0129345 | A1 | 5/2012 | Lee | |
| 2012/0157368 | A1 | 6/2012 | Mizuta | |
| 2013/0225464 | A1 | 8/2013 | Harada | |
| 2014/0264151 | A1 | 9/2014 | Ko | |
| 2014/0318584 | A1 * | 10/2014 | Cooper | H01L 21/31133 510/176 |
| 2016/0179011 | A1 | 6/2016 | Agarwal | |
| 2016/0254139 | A1 * | 9/2016 | Kamimura | B08B 3/10 510/176 |
| 2019/0256805 | A1 | 8/2019 | Goto | |
| 2020/0231900 | A1 * | 7/2020 | Harada | C11D 1/345 |
| 2023/0159864 | A1 * | 5/2023 | Sugishima | H01L 21/02068 438/706 |

FOREIGN PATENT DOCUMENTS

| | | | |
|---|---|---|---|
| EP | 1628336 | A2 | 2/2006 |
| JP | 2819392 | B | 10/1998 |
| JP | 6751015 | B | 9/2020 |
| TW | 201211238 | A | 3/2012 |
| TW | 202128974 | A | 8/2021 |
| WO | WO 0040347 | A1 | 7/2000 |
| WO | WO 0204233 | A1 | 1/2002 |
| WO | WO 02/33033 | A1 | 4/2002 |
| WO | WO 2021/153122 | A1 | 8/2021 |

* cited by examiner

CLEANING LIQUID AND METHOD FOR CLEANING SUBSTRATE

BACKGROUND OF THE INVENTION

Field of the Invention

The present invention relates to a cleaning liquid and a method for cleaning a substrate.

Priority is claimed on Japanese Patent Application No. 2021-214865 filed on Dec. 28, 2021, the content of which is incorporated herein by reference.

Description of Related Art

In a wiring substrate used for a semiconductor device, a liner layer, a barrier layer, or the like may be provided adjacent to a wiring layer in formation of the wiring layer. It is being studied to use ruthenium as a material for forming those layers to, for example, reduce resistance and improve embedding for next-generation wiring lines.

In a step of producing a wiring substrate, planarization by chemical mechanical polishing (CMP), via formation, and the like are performed. After these steps, the substrate is cleaned to remove impurities such as shavings adhering to the substrate.

For example, an aqueous composition including an organic base, a copper etchant, an organic ligand, and a hydrazide compound as a cleaning composition used after CMP of a copper wiring substrate is described in Japanese Patent No. 6751015.

SUMMARY OF THE INVENTION

In a wiring substrate that uses a base metal such as copper as a wiring material and uses a noble metal such as ruthenium as a liner layer and the like, a base metal-containing substance and a noble metal-containing substance are present adjacent to each other. In a case where such a wiring substrate is cleaned with a cleaning liquid in the related art, a corrosion potential difference between the base metal and the noble metal increases, and galvanic corrosion easily occurs. Therefore, a cleaning liquid that can reduce a corrosion potential difference between the base metal and the noble metal is required.

The present invention has been made in view of the circumstances, and has an object to provide a cleaning liquid that can reduce a corrosion potential difference between metals in a substrate having a base metal-containing substance and a noble metal-containing substance, both the substances being present adjacent to each other; and a method for cleaning a substrate using the cleaning liquid.

In order to accomplish the object, the present invention employs the following configurations.

A first aspect of the present invention is a cleaning liquid for cleaning a substrate having a first metal atom-containing layer that contains ruthenium and a second metal atom-containing layer that contains a metal atom other than ruthenium, both the layers being present in contact with each other, where at least one of the first metal atom-containing layer and the second metal atom-containing layer is exposed on a surface, in which the cleaning liquid includes at least one hydrazine compound (A) selected from the group consisting of a compound represented by General Formula (a1), a hydrate of the compound, and a salt of the compound, and at least one basic compound (B) selected from the group consisting of an amine other than the hydrazine compound (A) and a quaternary hydroxide.

(a1)

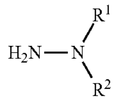

[In the formula, $R^1$ and $R^2$ each independently represent an organic group including no carbonyl group or a hydrogen atom.]

A second aspect of the present invention is a cleaning liquid for cleaning a substrate having a first metal atom-containing layer that contains a noble metal atom and a second metal atom-containing layer that contains a base metal atom, both the layers being present in contact with each other, where at least one of the first metal atom-containing layer and the second metal atom-containing layer is exposed on a surface, in which the cleaning liquid includes at least one hydrazine compound (A) selected from the group consisting of a compound represented by General Formula (a1), a hydrate of the compound, and a salt of the compound, and at least one basic compound (B) selected from the group consisting of an amine other than the hydrazine compound (A) and a quaternary hydroxide.

(a1)

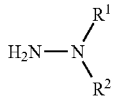

[In the formula, $R^1$ and $R^2$ each independently represent an organic group including no carbonyl group or a hydrogen atom.]

A third aspect of the present invention is to provide a method for cleaning a substrate having a first metal atom-containing layer that contains a ruthenium atom and a second metal atom-containing layer that contains a metal atom other than ruthenium, both the layers being present in contact with each other, in which the method includes a step of cleaning a substrate where at least one of the first metal atom-containing layer and the second metal atom-containing layer is exposed on a surface, using the cleaning liquid according to the first or second aspect.

A fourth aspect of the present invention is to provide a method for cleaning a substrate having a first metal atom-containing layer that contains a noble metal atom and a second metal atom-containing layer that contains a base metal atom, both the layers being present in contact with each other, in which the method includes a step of cleaning the substrate where at least one of the first metal atom-containing layer and the second metal atom-containing layer is exposed on a surface, using the cleaning liquid according to the first or second aspect.

According to the present invention, there are provided a cleaning liquid that can reduce a corrosion potential difference between metals in a substrate having a base metal-containing substance and a noble metal-containing substance, both the substances being present adjacent to each other; and a method for cleaning a substrate using the cleaning liquid.

Figure 1A:
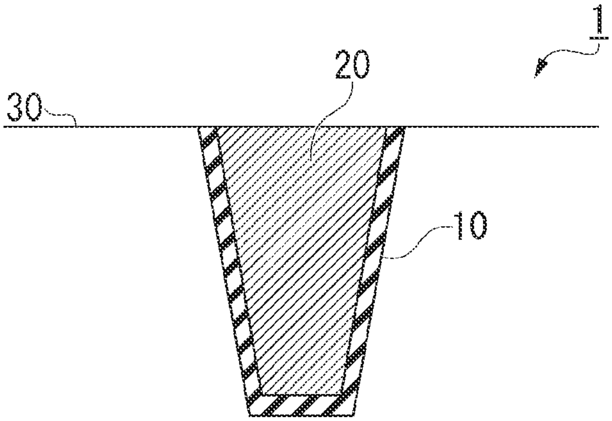
FIG. 1A shows an example of a substrate to which a cleaning liquid of one embodiment is applied.

DETAILED DESCRIPTION OF THE INVENTION (First Aspect: Cleaning Liquid)

The cleaning liquid according to a first aspect of the present invention includes at least one hydrazine compound (A) selected from the group consisting of a compound represented by General Formula (a1), a hydrate of the compound, and a salt of the compound, and at least one basic compound (B) selected from the group consisting of an amine other than the hydrazine compound (A) and a quaternary hydroxide.

The cleaning liquid according to the present aspect is used for cleaning a substrate having a first metal atom-containing layer that contains ruthenium and a second metal atom-containing layer that contains a metal atom other than ruthenium, both the layers being present in contact with each other, where at least one of the first metal atom-containing layer and the second metal atom-containing layer is exposed on the surface.

(a1)

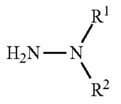

[In the formula, $R^1$ and $R^2$ each independently represent an organic group including no carbonyl group or a hydrogen atom.]

<Hydrazine Compound (A)>

The cleaning liquid according to the present embodiment contains at least one hydrazine compound (A) (hereinafter also referred to as a "(A) component") selected from the group consisting of a compound represented by General Formula (a1) (hereinafter also referred to as a "compound (A1)"), a hydrate of the compound, and a salt of the compound. The (A) component has an action of reducing a corrosion potential difference between both metals in a step of cleaning a substrates having a noble metal such as ruthenium and a metal other than ruthenium (for example, a base metal such as copper), both the metals being adjacent to each other, each of which will be described later.

In Formula (a1), $R^1$ and $R^2$ each independently represent an organic group including no carbonyl group or a hydrogen atom. Since the organic group in $R^1$ and $R^2$ includes no carbonyl group, the compound (A) does not serve as a hydrazide.

Examples of the organic group in $R^1$ and $R^2$ include a hydrocarbon group which may have a substituent. The hydrocarbon group may be either an aliphatic hydrocarbon group or an aromatic hydrocarbon group.

The aliphatic hydrocarbon group in $R^1$ and $R^2$ may be either a saturated aliphatic hydrocarbon group or an unsaturated aliphatic hydrocarbon group. The aliphatic hydrocarbon group may be linear or branched, and may include a ring structure.

Examples of the linear aliphatic hydrocarbon group include a linear alkyl group having 1 to 10 carbon atoms, and the linear aliphatic hydrocarbon group preferably has 1 to 8 carbon atoms, more preferably has 1 to 6 carbon atoms, still more preferably has 1 to 4 carbon atoms or 1 to 3 carbon atoms, and particularly preferably has 1 or 2 carbon atoms. Specific examples thereof include a methyl group, an ethyl group, an n-propyl group, an n-butyl group, and an n-pentyl group.

Examples of the branched aliphatic hydrocarbon group include a branched alkyl group having 3 to 10 carbon atoms, and the branched aliphatic hydrocarbon group preferably has 3 to 8 carbon atoms, more preferably has 3 to 6 carbon atoms, and still more preferably has 3 or 4 carbon atoms. Specific examples thereof include an isopropyl group, an isobutyl group, a tert-butyl group, an isopentyl group, a neopentyl group, a 1,1-diethylpropyl group, and a 2,2-dimethylbutyl group.

The aliphatic hydrocarbon group including a ring structure is an aliphatic hydrocarbon group including an alicyclic group. The alicyclic group may be either a monocyclic group or a polycyclic group.

Examples of the monocyclic aliphatic hydrocarbon groups include a group obtained by removing one hydrogen atom from a monocycloalkane. The monocycloalkane preferably has 3 to 6 carbon atoms. Specific examples of the monocycloalkane include cyclopropane, cyclopentane, and cyclohexane.

Examples of the aliphatic hydrocarbon group of the polycyclic group include a group obtained by removing one hydrogen atom from a polycycloalkane. The polycycloalkane preferably has 7 to 12 carbon atoms. Specific examples of the polycycloalkane include adamantane, norbornane, isobornane, tricyclodecane, and tetracyclododecane.

The aromatic hydrocarbon group in $R^1$ and $R^2$ is a hydrocarbon group having at least one aromatic ring. The aromatic ring is not particularly limited as long as it is a cyclic conjugated system having $4n+2$ $\pi$ electrons, and may be monocyclic or polycyclic. The aromatic ring preferably has 5 to 30 carbon atoms, more preferably has 5 to 20 carbon atoms, still more preferably has 6 to 15 carbon atoms, and particularly preferably has 6 to 12 carbon atoms.

Specific examples of the aromatic ring include aromatic hydrocarbon rings such as benzene, naphthalene, anthracene, and phenanthrene; and aromatic heterocyclic rings in which some of carbon atoms constituting the aromatic hydrocarbon ring are substituted with heteroatoms. Examples of the heteroatom in the aromatic heterocyclic ring include an oxygen atom, a sulfur atom, and a nitrogen atom. Specific examples of the aromatic heterocyclic rings include a pyridine ring and a thiophene ring.

Specific examples of the aromatic hydrocarbon group include a group (an aryl group or a heteroaryl group) obtained by removing one hydrogen atom from the aromatic hydrocarbon ring or the aromatic heterocyclic ring; a group obtained by removing one hydrogen atom from an aromatic compound including two or more aromatic rings (for example, biphenyl and fluorene); and a group obtained by substituting one of the hydrogen atoms of the aromatic hydrocarbon ring or the aromatic heterocyclic ring with an alkylene group (for example, arylalkyl groups such as a benzyl group, a phenethyl group, a 1-naphthylmethyl group, a 2-naphthylmethyl group, a 1-naphthylethyl group, and a 2-naphthylethyl group). The alkylene group bonded to the aromatic hydrocarbon ring or the aromatic heterocyclic ring preferably has 1 to 4 carbon atoms, more preferably has 1 to 3 carbon atoms, and particularly preferably has 1 carbon atom.

The hydrocarbon group in $R^1$ and $R^2$ may have a substituent. The substituent is not particularly limited, but examples thereof include a hydroxy group, an alkyl group, and a vinyl group. It should be noted that the substituent includes no carbonyl group.

$R^1$ and $R^2$ are each preferably an aliphatic hydrocarbon group which may have a substituent, or a hydrogen atom, more preferably a linear or branched alkyl group which may have a substituent, or the hydrogen atom, and still more preferably a linear or branched hydroxyalkyl group, a linear or branched hydroxyalkyl group, or the hydrogen atom. The linear hydroxyalkyl group or the linear alkyl group preferably has 1 to 6 carbon atoms, more preferably has 1 to 3 carbon atoms, and still more preferably has 1 or 2 carbon atoms. The branched hydroxyalkyl group or the linear alkyl group preferably has 3 to 6 carbon atoms, and more preferably has 3 carbon atoms.

Specific examples of the compound (A1) include, but are not limited to, hydrazine, 2-hydrazinoethanol, t-butylhydrazine, 1,1-diethylhydrazine, 1,2-diethylhydrazine, methylhydrazine, ethylhydrazine, 1,1-dimethylhydrazine, 1,2-dimethylhydrazine, 1,2-diisopropylhydrazine, cyclohexylhydrazine, allylhydrazine, isopropylhydrazine, and tolylhydrazine.

The (A) component may be a hydrate of the compound (A1). The number of hydrated water molecule in the hydrate of the compound (A1) is not particularly limited. Examples of the hydrate of the compound (A1) include a monohydrate, a dihydrate, and a trihydrate. Specific examples of the hydrate of the compound (A1) include a hydrazine monohydrate.

The (A) component may be a salt of the compound (A1). The salt of the compound (A1) may be either a salt with an inorganic substance or a salt with an organic substance. The salt is not particularly limited, but examples thereof include a hydrochloride, a sulfate, and a carbonate. Specific examples of the salt of the compound (A1) include t-butylhydrazine hydrochloride, hydrazine sulfate, hydrazine carbonate, and tolylhydrazine hydrochloride.

The (A) component may be used alone or in combination of two or more kinds thereof.

The amount of the (A) component in the cleaning liquid of the present embodiment is not particularly limited, but may be 1.0% by mass (10,000 ppm) or less, and is preferably 0.3% by mass (3,000 ppm) or less, more preferably 0.1% by mass (1,000 ppm) or less, still more preferably 0.05% by mass (500 ppm) or less, and particularly preferably 0.02% by mass (200 ppm) or less, with respect to the total mass of the cleaning liquid. Since the (A) component also includes a deleterious substance, it is preferable to use the (A) component at a low concentration as long as the effect of the (A) component is expressed. The amount of the (A) component in the cleaning liquid of the present embodiment may be, for example, 0.01% by mass (100 ppm) or less, or 0.009% by mass (90 ppm) or less.

The lower limit value of the amount of the (A) component is not particularly limited, but may be 0.0001% by mass (1 ppm) or more, and is preferably 0.0005% by mass (5 ppm) or more, more preferably 0.001% by mass (10 ppm) or more, still more preferably 0.002% by mass (20 ppm) or more, and particularly preferably 0.003% by mass (30 ppm) or more, with respect to the total mass of the cleaning liquid. In a case where the amount of the (A) component is the preferred lower limit value or more, the corrosion potential difference between noble metals such as ruthenium and other metals (base metals or non-ruthenium metals which will be described later) is likely to be reduced at the time of cleaning the substrate with the cleaning liquid of the present embodiment.

The range of the amount of the (A) component in the cleaning liquid of the present embodiment may be 0.0001% by mass (1 ppm) to 1.0% by mass (10,000 ppm), and is preferably 0.0001% by mass (1 ppm) to 0.3% by mass (3,000 ppm) or 0.0005% by mass (5 ppm) to 0.1% by mass (1,000 ppm), more preferably 0.002% by mass (20 ppm) to 0.05% by mass (500 ppm), and particularly preferably 0.002% by mass (30 ppm) to 0.02% by mass (200 ppm) or 0.002% by mass (30 ppm) to 0.009% by mass (90 ppm), with respect to the total mass of the cleaning liquid.

<Basic Compound (B)>

The cleaning liquid of the present embodiment contains at least one basic compound (B) (hereinafter also referred to as a "(B) component") selected from the group consisting of an amine other than the hydrazine compound (A), and a quaternary hydroxide. By the (B) component, the pH of the cleaning liquid can be increased. Thus, the cleaning performance is improved.

<<Quaternary Hydroxide: (B1) Component>>

The (B) component may be a quaternary hydroxide (hereinafter also referred to as a "(B1) component"). Examples of the (B1) component include a compound represented by General Formula (b1).

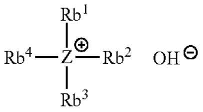

(b1)

[In the formula, $Rb^1$ to $Rb^4$ each independently represent a hydrocarbon group which may have a substituent; and Z represents a nitrogen atom or a phosphorus atom.]

In Formula (b1), $Rb^1$ to $Rb^4$ each independently represent a hydrocarbon group which may have a substituent.

The hydrocarbon group which may have a substituent in $Rb^1$ to $Rb^4$ may be an aliphatic hydrocarbon group which may have a substituent or an aromatic hydrocarbon group which may have a substituent. Examples of the aliphatic hydrocarbon group include those exemplified for $R^1$ and $R^2$ in Formula (a1). Examples of the aromatic hydrocarbon group include the same groups as those exemplified for $R^1$ and $R^2$ in Formula (a1).

The hydrocarbon group in $Rb^1$ to $Rb^4$ may have a substituent. The substituent is not particularly limited, but examples thereof include a hydroxy group.

$Rb^1$ to $Rb^4$ are each preferably an aliphatic hydrocarbon group which may have a substituent, more preferably a linear or branched alkyl group which may have a substituent, and still more preferably a linear or branched hydroxyalkyl group, a linear or branched hydroxyalkyl group, or a hydrogen atom. The linear hydroxyalkyl group or the linear alkyl group preferably has 1 to 6 carbon atoms, more preferably has 1 to 3 carbon atoms, and still more preferably has 1 or 2 carbon atoms. The branched hydroxyalkyl group or the linear alkyl group preferably has 3 to 6 carbon atoms, and more preferably has 3 carbon atoms.

In Formula (b1), Z represents a nitrogen atom or a phosphorus atom.

In a case where the (B1) component is a quaternary amine hydroxide, specific examples thereof include tetraethylammonium hydroxide (TEAH), tetramethylammonium hydroxide (TMAH), tetrapropylammonium hydroxide (TPAH), tetrabutylammonium hydroxide (TBAH), tetrapropylammonium hydroxide (TPAH), dimethylbis(2-hydroxyethyl)ammonium hydroxide (DMEMAH), tris(2-hydroxyethyl)methylammonium hydroxide (THEMAH), choline, dimethyldiethylammonium hydroxide, tetraethanolammonium hydroxide, benzyltrimethylammonium hydroxide, benzyltriethylammonium hydroxide, and benzyltributylammonium hydroxide.

In a case where the (B1) component is a quaternary phosphonium hydroxide, specific examples thereof include tetrabutylphosphonium hydroxide, tetrapropylphosphonium hydroxide, tetraethylphosphonium hydroxide, tetramethylphosphonium hydroxide, tetraphenylphosphonium hydroxide, methyltriphenylphosphonium hydroxide, ethyltriphenylphosphonium hydroxide, propyltriphenylphosphonium hydroxide, butyltriphenylphosphonium hydroxide, benzyltriphenylphosphonium hydroxide, allyltriphenylphosphonium hydroxide, dodecyltriphenylphosphonium hydroxide, tetradecyltriphenylphosphonium hydroxide, hexadecyltriphenylphosphonium hydroxide, and hexadecyltributylphosphonium hydroxide.

As the (B1) component, TEAH, TMAH, DMEMAH, THEMAH, choline, and tetrabutylphosphonium hydroxide are preferable.

<<Amine Other than (A) Component: (B2) Component>>

The (B) component may be an amine other than the (A) component (hereinafter also referred to as a "(B2) component"). It should be noted that those corresponding to the (B1) component are excluded from the (B2) component. Examples of the (B2) component include ammonia, primary monoamines, secondary monoamines, tertiary monoamines, quaternary ammonium salts other than hydroxides, secondary cyclic amines, tertiary cyclic amines, quaternary cyclic amines, primary alkanolamines, secondary alkanolamines, tertiary alkanolamines, diamines, and polyamines. The amine of the (B2) component is not particularly limited as long as it exhibits basicity, but a water-soluble amine is preferable. The (B2) component preferably exhibits basicity in an aqueous solution. The (B2) component is preferably an aliphatic amine from the viewpoint of water solubility.

Examples of the primary monoamines include, but are not limited to, alkylamines such as methylamine, ethylamine, propylamine, n-butylamine, isopropylamine, and tert-butylamine; cycloalkylamines such as cyclopentylamine, cyclohexylamine, and cyclohexanemethylamine; and alkoxyamines such as methoxyethylamine, methoxypropylamine, methoxybutylamine, ethoxypropylamine, and propoxypropylamine.

Examples of the secondary monoamines include, but are not limited to, alkylamines such as dimethylamine, diethylamine, methylethylamine, dipropylamine, diisopropylamine, dibutylamine, diisobutylamine, and butylmethylamine; cycloalkylamines such as N,N-dicyclohexylamine and N-cyclopentylcyclohexanamine; and alkoxyamines such as methoxy(methylamine) and N-(2-methoxyethyl)ethylamine.

Examples of the tertiary monoamines include, but are not limited to, alkylamines such as trimethylamine, triethylamine, tripropylamine, tributylamine, triisobutylamine, dimethylethylamine, dimethylpropylamine, allyldiethylamine, dimethyl-n-butylamine, and diethylisopropylamine; and cycloalkylamines such as tricyclopentylamine and tricyclohexylamine.

Examples of the quaternary ammonium salts include quaternary ammonium fluorides, chlorides, bromides, iodides, sulfates, hydrogensulfates, and acetates. Examples of a quaternary ammonium cation include the same ones as the cation moiety of Formula (b1). Specific examples of the quaternary ammonium salts include, but are not limited to, tetraethylammonium chloride, tetramethylammonium chloride, tetrapropylammonium chloride, tetrabutylammonium chloride, tetrapropylammonium chloride, tetraethylammonium bromide, tetramethylammonium bromide, tetrapropylammonium bromide, tetrabutylammonium bromide, tetrapropylammonium bromide, tetraethylammonium fluoride, tetramethylammonium fluoride, tetrapropylammonium fluoride, tetrabutylammonium fluoride, tetrapropylammonium fluoride, tetraethylammonium iodide, tetramethylammonium iodide, tetrapropylammonium iodide, tetrabutylammonium iodide, tetrapropylammonium iodide, tetraethylammonium hydrogensulfate, tetramethylammonium hydrogensulfate, tetrabutylammonium hydrogensulfate, and tetrapropylammonium hydrogensulfate.

Examples of the secondary cyclic amines include piperidines (compounds having a piperidine skeleton), pyrrolidines (compounds having a pyrrolidine skeleton), and morpholines (compounds having a morpholine skeleton). Examples of the piperidines which are secondary cyclic amines include piperidine, 2-pipecoline, 3-pipecoline, 4-pipecoline, 2,6-dimethylpiperidine, and 3,5-dimethylpiperidine. Examples of the pyrrolidines include pyrrolidine, 2-methylpyrrolidine, and 3-methylpyrrolidine. Examples of the morpholines include morpholine, 2-methylmorpholine, and 3-methylmorpholine.

Examples of the tertiary cyclic amines include piperidines, pyrrolidines, and morpholines. Examples of the piperidines include N-methylpiperidine. Examples of the pyrrolidines include N-methylpyrrolidine. Examples of the morpholines include N-methylmorpholine.

Examples of the quaternary cyclic amines include fluorides such as piperidines, pyrrolidines, and morpholines, chlorides, bromides, iodides, sulfates, hydrogensulfates, and acetates.

Examples of the primary alkanolamines include, but are not limited to, methanolamine, 2-aminoethanol, 1-amino-2-propanol, 2-amino-1-propanol, 4-amino-1-butanolamine, 2-amino-2-methyl-1-propanol, and 2-(2-aminoethoxy)ethanol.

Examples of the secondary alkanols include, but are not limited to, N-methylethanolamine, N-ethylethanolamine, N-methylpropanolamine, diethanolamine, diisopropanolamine, 2-[(hydroxymethyl)amino]ethanol, 4-methylaminobutanol, 3-piperidinemethanol, 4-piperidinemethanol, 2-piperidineethanol, and 4-piperidineethanol.

Examples of the tertiary alkanols include, but are not limited to, N,N-dimethylethanolamine, N,N-dimethylpropanolamine, N,N-diethylethanolamine, N-ethyldiethanolamine, N-methyldiethanolamine, triethanolamine, and triisopropanolamine.

The diamine may be any of primary diamine, secondary diamine, and a tertiary diamine. Examples of the primary diamine include, but are not limited to, ethylenediamine, butane-1,4-diamine, 1,3-propanediamine, 1,6-hexanediamine, and pentane-1,5-diamine. Examples of the secondary diamine include, but not limited to, 2-methylpiperazine, 2,3-dimethylpiperazine, 2,5-dimethylpiperazine, N,N'-dimethylethanediamine, N,N'-dimethylpropanediamine, N,N'-diethylethylenediamine, N,N'-diethylpropanediamine, and N,N'-diisopropylethylenediamine. Examples of the tertiary diamine include, but are not limited to, 4-dimethylamino-pyridine, N,N,N',N'-tetramethylethylenediamine, N,N,N',N'-tetraethylethylenediamine, N,N,N',N'-tetramethyl-1,3-diaminopropane, N,N,N',N'-tetramethyl-1,3-diaminobutane, N',N'-tetramethyl-1,4-diaminobutane, N,N,N',N'-tetramethylphenylenediamine, and 1,2-dipiperidinoethane.

The polyamines are compounds including three or more amino groups. The polyamines may include any of a primary amino group, a secondary amino group, and a tertiary amino group. Examples of the polyamines include spermine, spermidine, 3,3'-iminobis(propylamine), N,N-bis(3-aminopropyl)methylamine, N,N-bis(3-aminopropyl)butylamine, N-(3-aminopropyl)-N-dodecylpropane-1,3-diamine, N,N,N',N",N"-pentamethyldiethylenetriamine, N,N,N',N",N"-pentamethyldipropylenetriamine, tris[2-(dimethylamino)ethyl]amine, 2-aminomethylpyrimidine, 1,4-bis(3-aminopropyl)piperazine, 1-amino-4-cyclopentylpiperazine, and 1-(2-pyridyl)piperazine.

The (B2) component may be any of a tertiary amine, a secondary amine, and a primary amine, but is preferably the tertiary amine or the secondary amine, and more preferably the tertiary amine. The (B2) component is preferably a monoamine, more preferably a tertiary monoamine or a tertiary alkanolamine, and still more preferably a tertiary aliphatic monoamine or a tertiary alkanolamine; from the viewpoint of adjusting an amount of an oxide film to be removed, the tertiary aliphatic monoamine is particularly preferable; and from the viewpoints of good cleanability after removal, the tertiary alkanolamine is particularly preferable.

The (B) component is preferably the (B1) component or the tertiary amine, more preferably the (B1) component, the tertiary monoamine, or the tertiary alkanolamine, still more preferably the (B1) component, the tertiary aliphatic monoamine, or the tertiary alkanolamine, and particularly preferably the (B1) component.

The (B) component may be used alone or in combination of two or more kinds thereof.

The amount of the (B) component in the cleaning liquid of the present embodiment is not particularly limited, but is preferably 10% by mass or less, more preferably 8% by mass or less, still more preferably 5% by mass or less, and particularly preferably 4% by mass, 3% by mass or less, or 2% by mass or less, with respect to the total mass of the cleaning liquid. The lower limit value of the amount of the (B) component is not particularly limited, but may be 0.001% by mass or more, and is preferably 0.005% by mass or more, more preferably 0.01% by mass or more, still more preferably 0.02% by mass or more, and particularly preferably 0.03% by mass or more, or 0.05% by mass or more, with respect to the total mass of the cleaning liquid. In a case where the amount of the (B) component is the preferred lower limit value or more, it is easy to maintain the pH of the cleaning liquid at a high level. In a case where the amount of the (B) component is the preferred upper limit value or less, it is easier to achieve a balance with other components.

The range of the amount of the (B) component in the cleaning liquid of the present embodiment may be 0.001% by mass to 10% by mass, and is preferably 0.002% by mass to 5% by mass, more preferably 0.01% by mass to 3% by mass, and particularly preferably 0.02% by mass to 2% by mass, or 0.03% by mass to 1.5% by mass, with respect to the total mass of the cleaning liquid.

The cleaning liquid of the present embodiment may not contain the (B1) component as long as it contains the (B2) component. The cleaning liquid of the present embodiment may contain no other (B1) components as long as it contains one (B1) component. The cleaning liquid of the present embodiment may not contain, for example, one or more of the compounds provided as exemplary specific examples of the quaternary hydroxide.

The cleaning liquid of the present embodiment may not contain the (B2) component as long as it contains the (B1) component. The cleaning liquid of the present embodiment may contain no other (B2) component as long as it contains one (B2) component. The cleaning liquid of the present embodiment may not contain, for example, one or more selected from the group consisting of a primary monoamine, a secondary monoamine, a tertiary monoamine, a quaternary ammonium salt, a secondary cyclic amine, a tertiary cyclic amine, a quaternary cyclic amine, a primary alkanolamine, a secondary alkanolamine, a tertiary alkanolamine, a diamine, and a polyamine. The cleaning liquid of the present embodiment may not contain, for example, one or more of the compounds provided as specific exemplary examples of these amines. The cleaning liquid of the present embodiment may not contain, for example, one or more selected from the group consisting of a primary aromatic monoamine, a secondary aromatic monoamine, a tertiary aromatic monoamine, a quaternary aromatic ammonium salt, a primary aminophenol, a secondary aminophenol, a tertiary aminophenol, an aromatic diamine, and an aromatic polyamine.

<Optional Components>

The cleaning liquid of the present embodiment may include optional components in addition to the (A) component and the (B) component. Examples of the optional components include a hydroxycarboxylic acid, water, a water-soluble organic solvent, a surfactant, and an anticorrosive agent.

<<Hydroxycarboxylic Acid (C)>>

The cleaning liquid of the present embodiment may contain a hydroxycarboxylic acid (C) (hereinafter also referred to as a "(C) component"). The (C) component improves the detergency of the cleaning liquid.

The hydroxycarboxylic acid is a compound including a hydroxy group and a carboxy group. As used herein, the hydroxycarboxylic acid means a compound consisting of a hydroxy group, a carboxy group, and a hydrocarbon group. The hydroxycarboxylic acid has no functional groups other than the hydroxy group and carboxy groups, and includes no atoms other than a hydrogen atom, an oxygen atom, and a carbon atom. The hydroxycarboxylic acid may be either an aliphatic hydroxycarboxylic acid or an aromatic hydroxycarboxylic acid, and is preferably the aliphatic hydroxycarboxylic acid.

Examples of the aliphatic hydroxycarboxylic acid include gluconic acid, citric acid, lactic acid, glycolic acid, malic acid, tartaric acid, glucuronic acid, glucaric acid, lactobionic acid, N-acetylneuraminic acid, N-glycolylneuraminic acid, and deaminoneuraminic acid.

The hydroxycarboxylic acid is preferably an aliphatic hydroxycarboxylic acid, more preferably gluconic acid, tartaric acid, malic acid, or citric acid, and still more preferably citric acid or gluconic acid.

The (C) component may be used alone or in combination of two or more kinds thereof.

In a case where the cleaning liquid of the present embodiment contains the (C) component, the amount of the (C) component is not particularly limited, but is preferably 10% by mass or less, more preferably 8% by mass or less, still more preferably 5% by mass or less, and particularly preferably 3% by mass or less, 2% by mass or less, 1% by mass or less, 0.8% by mass or less, 0.6% by mass or less, or 0.5% by mass or less, with respect to the total mass of the cleaning liquid. The lower limit value of the amount of the (C) component is not particularly limited, but may be 0.001% by mass or more, and is preferably 0.005% by mass or more, still more preferably 0.01% by mass or more, still more preferably 0.02% by mass or more, and particularly preferably 0.03% by mass or more, or 0.1% by mass or more, with respect to the total mass of the cleaning liquid. In a case where the amount of the (C) component is the preferred lower limit value or more, the cleanability is further improved. In a case where the amount of the (C) component is the preferred upper limit value or less, it is easier to achieve a balance with other components.

The range of the amount of the (C) component in the cleaning liquid of the present embodiment may be 0.001% by mass to 10% by mass, and is preferably 0.005% by mass to 5% by mass, more preferably 0.01% by mass to 1% by mass, and particularly preferably 0.02% by mass to 0.8% by mass, or 0.03% by mass to 0.5% by mass, with respect to the total mass of the cleaning liquid.

The cleaning liquid of the present embodiment may not contain a hydroxycarboxylic acid, and may not contain one or more of the compounds provided as specific exemplary examples of the hydroxycarboxylic acid.

<<Water>>

The cleaning liquid of the present embodiment preferably contains water as a solvent. The water may include trace ingredients which are unavoidably included. The water used in the cleaning liquid of the present embodiment is preferably water that has been subjected to a purification treatment, such as distilled water, ion exchange water, and ultrapure water, and ultrapure water generally used in the production of a semiconductor is more preferably used.

The amount of water in the cleaning liquid of the present embodiment is not particularly limited, but is preferably 80% by mass or more, more preferably 90% by mass or more, still more preferably 95% by mass or more, and particularly preferably 97% by mass or more. The upper limit value of the amount of water in the cleaning liquid of the present embodiment is not particularly limited, but is preferably less than 99.95% by mass, more preferably 99.9% by mass or less, still more preferably 99.7% by mass or less, and further still more preferably 99.4% by mass or less.

<<Anticorrosive Agent: (D)>>

The cleaning liquid of the present embodiment may contain an anticorrosive agent.

Examples of the anticorrosive agent include compounds including a nitrogen-containing heterocyclic ring such as a triazole ring, an imidazole ring, a pyridine ring, a phenanthroline ring, a tetrazole ring, a pyrazole ring, a pyrimidine ring, and a purine ring.

Examples of the compound including a triazole ring include triazoles such as 1,2,3-triazole, 1,2,4-triazole, 3-amino-1H-1,2,4-triazole, 1-acetyl-1H-1,2,3-triazolo[4,5-b]pyridine, 1H-1,2,3-triazolo[4,5-b]pyridine, 1,2,4-triazolo[4,3-a]pyridin-3(2H)-one, and 3H-1,2,3-triazolo[4,5-b]pyridin-3-ol; and benzotriazoles such as 1,2,3-benzotriazole, 5-methyl-1H-benzotriazole, 1-hydroxybenzotriazole, 1-dihydroxypropylbenzotriazole, 2,3-dicarboxypropylbenzotriazole, 4-hydroxybenzotriazole, 4-carboxyl-1H-benzotriazole, 4-carboxyl-1H-benzotriazole methyl ester, 4-carboxyl-1H-benzotriazole butyl ester, 4-carboxyl-1H-benzotriazole octyl ester, 5-hexylbenzotriazole, [1,2,3-benzotriazolyl-1-methyl][1,2,4-triazolyl-1-methyl][2-ethylhexyl]amine, tolyltriazole, naphthotriazole, bis[(1-benzotriazolyl)methyl]phosphonic acid, and 3-aminotriazole.

Examples of the compound including an imidazole ring include imidazoles such as 2-methylimidazole, 2-ethylimidazole, 2-isopropylimidazole, 2-propylimidazole, 2-butylimidazole, 4-methylimidazole, 2,4-dimethylimidazole, 2-ethyl-4-methylimidazole, 2-undecylimidazole, 2-aminoimidazole, and benzimidazole; and biimidazoles such as 2,2'-biimidazole. Among those, the biimidazoles are preferable, and 2,2'-biimidazole is more preferred.

Examples of the compound including a pyridine ring include pyridines such as 1H-1,2,3-triazolo[4,5-b]pyridine, 1-acetyl-1H-1,2,3-triazolo[4,5-b]pyridine, 3-aminopyridine, 4-aminopyridine, 3-hydroxypyridine, 4-hydroxypyridine, 2-acetamidopyridine, 4-pyrrolidinopyridine, 2-cyanopyridine, 2,6-pyridinecarboxylic acid, and 2,4,6-trimethylpyridine; and bipyridyls such as 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2''-bipyridine-6,6'-dicarboxylic acid, and 4,4'-dimethoxy-2,2'-bipyridyl. Among those, bipyridyls are preferable, and 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2''-bipyridine-6,6'-dicarboxylic acid, and 4,4'-dimethoxy-2,2'-bipyridyl are more preferable.

Examples of the compound including a phenanthroline ring include 1,10-phenanthroline.

Examples of the compound including a tetrazole ring include 1H-tetrazole, 5-amino-1H-tetrazole, 5-methyl-1H-tetrazole, 5-phenyl-1H-tetrazole, and 1-(2-diaminoethyl)-5-mercaptotetrazole.

Examples of the compound including a pyrazole ring include 3,5-dimethylpyrazole, 3-amino-5-methylpyrazole, 4-methylpyrazole, and 3-amino-5-hydroxypyrazole.

Examples of the compound including a pyrimidine ring include pyrimidine, 4-methylpyrimidine, 1,2,4-triazolo[1,5-a]pyrimidine, 1,3,4,6,7,8-hexahydro-2H-pyrimido[1,2-a]pyrimidine, 1,3-diphenyl-pyrimidine-2,4,6-trione, 1,4,5,6-tetrahydropyrimidine, 2,4,5,6-tetraaminopyrimidinesulfate, 2,4,5-trihydroxypyrimidine, 2,4,6-triaminopyrimidine, 2,4,6-trichloropyrimidine, 2,4,6-trimethoxypyrimidine, 2,4,6-triphenylpyrimidine, 2,4-diamino-6-hydroxypyrimidine, 2,4-diaminopyrimidine, 2-acetamidopyrimidine, 2-aminopyrimidine, 2-methyl-5,7-diphenyl-(1,2,4)triazolo(1,5-a)pyrimidine, 2-methylsulfanyl-5,7-diphenyl-(1,2,4)triazolo(1,5-a)pyrimidine, 2-methylsulfanyl-5,7-diphenyl-4,7-dihydro-(1,2,4)triazolo(1,5-a)pyrimidine, and 4-aminopyrazolo[3,4-d]pyrimidine.

Examples of the compound including a purine ring include adenine, guanine, hypoxanthine, xanthine, uric acid, and theophylline.

The anticorrosive agent may be used alone or in combination of two or more kinds thereof.

In a case where the cleaning liquid of the present embodiment contains the anticorrosive agent, the amount of the anticorrosive agent is not particularly limited, but is preferably 0.0001% to 0.2% by mass (1 to 2,000 ppm), more preferably 0.0003% to 0.1% by mass (3 to 1,000 ppm), still more preferably 0.0005% to 0.05% by mass (5 to 500 ppm), and particularly preferably 0.001% to 0.03% by mass (10 to 300 ppm), with respect to the total mass of the cleaning liquid.

The cleaning liquid of the present embodiment may not include one or more selected from the group consisting of a compound including a triazole ring, a compound including an imidazole ring, a compound including a pyridine ring, a compound including a phenanthroline ring, a compound including a tetrazole ring, a compound including a pyrazole ring, a compound including a pyrimidine ring, and a compound including a purine ring, and may not contain one or more of the compounds provided as specific exemplary examples of the anticorrosive agent. The cleaning liquid of the present embodiment may not contain the anticorrosive agent.

<<Buffer: (E)>>

The cleaning liquid of the present embodiment may contain a buffer. The buffer is a compound having an action of suppressing a change in the pH of a solution.

The buffer is not particularly limited as long as it is a compound having a pH buffering ability. As the buffer, for example, a compounds with a pKa of 6 to 11 can be used.

Examples of the buffer include a Good's buffer. Example of the Good's buffer include 2-cyclohexylaminoethanesulfonic acid (CHES), 3-cyclohexylaminopropanesulfonic acid (CAPS), N-tris(hydroxymethyl)methyl-3-aminopropanesulfonic acid (TAPS), 4-(cyclohexylamino)-1-butanesulfonic acid (CABS), tricine, bicine, 2-morpholinoethanesulfonic acid monohydrate (MES), bis(2-hydroxyethyl)aminotris(hydroxymethyl)methane (Bis-Tris), N-(2-acetamido)iminodiacetic acid (ADA), piperazine-1,4-bis(2-ethanesulfonic acid) (PIPES), N-(2-acetamido)-2-aminoethanesulfonic acid (ACES), 2-hydroxy-3-morpholinopropanesulfonic acid (MOPSO), N,N-bis(2-hydroxyethyl)-2-aminoethanesulfonic acid (BES), 3-morpholinopropanesulfonic acid (MOPS), N-tris(hydroxymethyl)methyl-2-aminoethanesulfonic acid (TES), 2-[4-(2-hydroxyethyl)-1-piperazinyl]ethanesulfonic acid (HEPES), 3-[N-tris(hydroxymethyl)methylamino]-2-hydroxypropanesulfonic acid (TAPSO), piperazine-1,4-bis(2-hydroxypropanesulfonic acid) (POPSO), 4-(2-hydroxyethyl)piperazine-1-(2-hydroxypropane-3-sulfonic acid) (HEPSO), and 4-(2-hydroxyethyl)-1-piperazinepropanesulfonic acid (EPPS).

The buffer may be used alone or in combination of two or more kinds thereof.

In a case where the cleaning liquid of the present embodiment contains the buffer, the amount of the buffer is not particularly limited, but may be 0.0010% by mass to 10% by mass, and is preferably 0.005% by mass to 5% by mass, more preferably 0.01% by mass to 1% by mass, and particularly preferably 0.05% by mass to 0.5% by mass, or 0.05% by mass to 0.3% by mass, with respect to the total mass of the cleaning liquid.

The cleaning liquid of the present embodiment may not contain the buffer, and may not contain one or more of the compounds provided as specific exemplary examples of the buffer.

<<Organic Solvent>>

The cleaning liquid of the present embodiment may contain an organic solvent within a range that does not impair the effect of the present invention. The organic solvent is preferably a water-soluble organic solvent. Examples of the water-soluble organic solvent include alcohols (for example, isopropanol, ethanol, ethylene glycol, propylene glycol, glycerin, 1,3-propanediol, 1,3-butanediol, 1,4-butanediol, diethylene glycol, dipropylene glycol, furfuryl alcohol, and 2-methyl-2,4-pentanediol), dimethyl sulfoxide, and ethers (for example, ethylene glycol dimethyl ether, diethylene glycol dimethyl ether, triethylene glycol dimethyl ether, tetraethylene glycol dimethyl ether, and propylene glycol dimethyl ether).

The water-soluble organic solvent may be used alone or in combination of two or more kinds thereof.

In a case where the cleaning liquid of the present embodiment contains the water-soluble organic solvent, the amount of the water-soluble organic solvent is preferably 50% by mass or less, more preferably 30% by mass or less, and still more preferably 20% by mass or less, with respect to a total of the amount of water and the amount of the water-soluble organic solvent.

The cleaning liquid of the present embodiment may not contain the organic solvent or the water-soluble organic solvent, and may not contain one or more of the compounds provided as specific exemplary examples of the water-soluble organic solvent.

<<Surfactant>>

The cleaning liquid of the present embodiment may contain a surfactant, for example, for the purpose of adjusting the wettability of the cleaning liquid to a substrate. Examples of the surfactant include a nonionic surfactant, an anionic surfactant, a cationic surfactant, and an amphoteric surfactant.

Examples of the nonionic surfactant include polyalkylene oxide alkylphenyl ether-based surfactants, polyalkylene oxide alkyl ether-based surfactants, block polymer-based surfactants consisting of polyethylene oxide and polypropylene oxide, polyoxyalkylene distyrenated phenyl ether-based surfactants, polyalkylene tribenzylphenyl ether-based surfactants, and acetylene polyalkylene oxide-based surfactants.

Examples of the anionic surfactant include alkylsulfonic acids, alkylbenzenesulfonic acids, alkylnaphthalenesulfonic acids, alkyldiphenyl ether sulfonic acids, fatty acid amidosulfonic acids, polyoxyethylene alkyl ether carboxylic acids, polyoxyethylene alkyl ether acetic acids, polyoxyethylene alkyl ether propionic acids, alkyl phosphonic acids, and fatty acid salts. Examples of the "salts" include ammonium salts, sodium salts, potassium salts, and tetramethylammonium salts.

Examples of the cationic surfactant include alkylpyridium-based surfactants. A quaternary ammonium salt-based surfactant may be used as the (B2) component.

Examples of the amphoteric surfactant include betaine type surfactants, amino acid type surfactants, imidazoline type surfactants, and amine oxide type surfactants.

These surfactants are generally commercially available. The surfactant may be used alone or in combination of two or more kinds thereof.

In a case where the cleaning liquid of the present embodiment contains the surfactant, the amount of the surfactant is not particularly limited, but is, for example, preferably 0.0001% to 5% by mass, more preferably 0.001% to 3% by mass, still more preferably 0.002% to 1% by mass, and particularly preferably 0.002% to 0.2% by mass with respect to the total mass of the cleaning liquid. In a case where the amount of the surfactant is within the preferred range, bubbles generated by the foaming agent are likely to be dense.

The cleaning liquid of the present embodiment may not contain one or more selected from the group consisting of a nonionic surfactant, an anionic surfactant, a cationic surfactant, and an amphoteric surfactant, and may not contain one or more of the compounds exemplified as the surfactant. The cleaning liquid of the present embodiment may not contain the surfactant.

<<Impurities and the Like>>

The cleaning liquid of the present embodiment may include metal impurities including metal atoms such as a Fe atom, a Cr atom, an Ni atom, a Zn atom, a Ca atom, and a Pb atom. The total amount of the metal atoms in the cleaning liquid of the present embodiment is preferably 100 ppt by mass or less with respect to the total mass of the cleaning liquid. The lower limit value of the total amount of the metal atoms is preferably as low as possible, but may be, for example, 0.001 ppt by mass or more. The total amount of the metal atoms may be, for example, 0.001 ppt by mass to 100 ppt by mass. By setting the total amount of the metal atoms to the preferred upper limit value or less, the defect suppressing properties and the residue suppressing properties of the cleaning liquid are improved. It is considered that by making the total amount of the metal atoms to the preferred lower limit value or more, the metal atoms are less likely to be free in the system and less likely to adversely affect a production yield of the entire object to be cleaned.

The amount of the metal impurities can be adjusted, for example, by a purification treatment such as filtering. A purification treatment such as filtering may be performed on a part or all of the raw materials before preparing the cleaning liquid, or may be performed after preparing the cleaning liquid.

The cleaning liquid of the present embodiment may include, for example, organic substance-derived impurities (organic impurities). The total amount of the organic impurities in the cleaning liquid of the present embodiment is preferably 5,000 ppm by mass or less. The lower limit of the amount of the organic impurities is more preferable, but may be, for example, 0.1 ppm by mass or more. The total amount of the organic impurities may be, for example, 0.1 ppm by mass to 5,000 ppm by mass.

The cleaning liquid of the present embodiment may include, for example, objects to be counted having a size that can be counted by a light scattering type in-liquid particle counter. The size of the object to be counted is, for example, 0.04 μm or more. The number of the objects to be counted in the cleaning liquid of the present embodiment is, for example, 1,000 or less per mL of the cleaning liquid, and the lower limit value is, for example, 1 or more. It is considered that in a case where the number of the objects to be counted in the cleaning liquid is within the range, the metal corrosion suppressing effect of the cleaning liquid is improved.

The organic impurities and/or the objects to be counted may be incorporated into the cleaning liquid, or may be inevitably mixed in the cleaning liquid during a step of producing the cleaning liquid. Examples of the cases where organic impurities are unavoidably incorporated in the step of producing the cleaning liquid include, but are not limited to, a case where organic impurities are included in raw materials (for example, an organic solvent) used in the production of the cleaning liquid, and a case where organic impurities are incorporated (for example, contamination) from the external environment during the step of producing the cleaning liquid.

In a case where the objects to be counted are added to the cleaning liquid, the existence ratio may be adjusted for each specific size in consideration of a surface roughness and the like of a cleaning target.

<pH>

The pH of the cleaning liquid of the present embodiment is preferably 8 or more and 13 or less. The pH of the cleaning liquid is preferably pH 9 or more, more preferably pH 10 or more, and still more preferably pH 11 or more. The pH of the cleaning liquid is preferably pH 14 or less, and more preferably pH 13.5 or less. The pH range of the cleaning liquid is preferably pH 8 to pH 13.5, and more preferably pH 9 to 13.0.

The pH value is a value measured with a pH meter under conditions of a normal temperature (23° C.) and a normal pressure (1 atm).

<Storage Container>

A method for storing the cleaning liquid of the present embodiment is not particularly limited, and storage containers known in the related art can be used. In order to ensure the stability of the cleaning liquid, a void ratio in a container in a case of storing the cleaning liquid in the container and/or a type of gas filling the voids may be appropriately set. For example, the void ratio in the storage container may be approximately 0.01% to 30% by volume.

In a case of using the cleaning liquid of the present embodiment, the cleaning liquid may be diluted 2 to 2,000 times to obtain a diluted liquid, and then a cleaning step may be performed using the diluted liquid.

In one embodiment, the cleaning liquid may not contain one or more selected from the group consisting of a hydrazide compound, an ethylene oxide-containing compound, a propylene oxide-containing compound, an alkylene oxide-containing compound, a fluorine compound, sugars, sugar alcohols, catechols, inorganic alkali compounds, alcohols, glycerin, glycerin derivatives, ascorbic acid, carbohydrazide, hydroquinone, hydroquinone monomethyl ether, hydroxyamine, diethylhydroxyamine, dimethylglyoxime, methylethylketoxime, ammonium sulfite, carboxylic acids, polyphosphonic acids, arylphosphonic acids, ammonium salts and alkali metal salts of the compounds, saturated aliphatic monohydric alcohols, alkoxy alcohols, glycols, glycol ethers, ketones, nitriles, aminopolycarboxylic acids, hydroxycarboxylic acids, purines, azoles, pyrimidines, thiazoles, thiazolinones, polyphenols, barbiturates, abrasives, and Schiff bases.

<Substrate>

The substrate to which the cleaning liquid of the present embodiment is applied is a substrate in which a first metal atom-containing layer that contains ruthenium and a second metal atom-containing layer that contains a metal atom (hereinafter also referred to as a "non-ruthenium metal") other than ruthenium are present in contact with each other. In the substrate, at least one of the first metal atom-containing layer and the second metal atom-containing layer is exposed on the surface.

The first metal atom-containing layer contains a ruthenium atom. The ruthenium atom contained in the first metal atom-containing layer may be any of a simple substance of ruthenium, a ruthenium alloy, and a ruthenium compound. Examples of the ruthenium compound include a ruthenium oxide, a ruthenium nitride, and a ruthenium oxynitride. The amount of ruthenium in the first metal atom-containing layer is preferably 20% by mass or more, more preferably 30% by mass or more, and still more preferably 40% by mass or more, and may be 100% by mass, with respect to the total mass of the composition forming the first metal atom-containing layer. The first metal atom-containing layer can be formed by a known method, and for example, CVD, ALD, or PVD can be used.

The second metal atom-containing layer contains anon-ruthenium metal. The non-ruthenium metal contained in the second metal atom-containing layer may be any of a non-ruthenium metal simple substance, a non-ruthenium metal alloy, and a non-ruthenium metal compound. Examples of the non-ruthenium metal compound include a non-ruthenium metal oxide, a non-ruthenium metal nitride, and a non-ruthenium metal oxynitride. In the second metal atom-containing layer, examples of the metal atom contained in the second metal atom-containing layer include metal atoms of base metals. As used herein, a base metal refer to copper, iron, nickel, aluminum, lead, zinc, tin, tungsten, molybdenum, tantalum, magnesium, cobalt, bismuth, cadmium, titanium, zirconium, antimony, manganese, beryllium, chromium, germanium, vanadium, gallium, hafnium, indium, niobium, rhenium, and thallium. Examples of the non-ruthenium metal contained in the second metal atom-containing layer include a simple base metal, a base metal alloy, a base metal oxide, a base metal nitride, and a base metal oxynitride.

Specific examples of the material for forming the second metal atom-containing layer include copper, titanium nitride (TiN), and tantalum nitride (TaN). The second metal atom-containing layer can be formed by a known method, and for example, plating, CVD, ALD, or PVD can be used.

In the substrate, at least one of the first metal atom-containing layer and the second metal atom-containing layer is exposed on the surface. Either one of the first metal atom-containing layer and the second metal atom-containing layer may be exposed, or the both may also be exposed.

In the substrate, the first metal atom-containing layer and the second metal atom-containing layer are present in contact with each other. At least a part of the first metal atom-containing layer and the second metal atom-containing layer may be in contact with each other. It is preferable that the first metal atom-containing layer and the second metal atom-containing layer are in contact with each other at a portion where at least one of the metal atom-containing layers is exposed. It is preferable that the first metal atom-containing layer and the second metal atom-containing layer are present adjacent to each other.

Figure 1B:
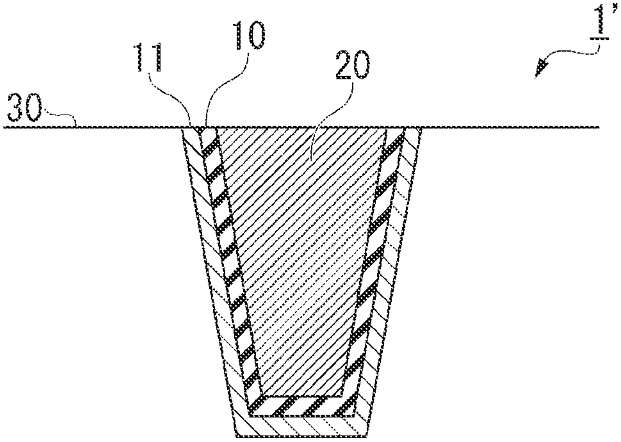
FIG. 1B shows an example of a substrate to which a cleaning liquid of one embodiment is applied.

FIG. 1A shows an example of a substrate to which a cleaning liquid of the present embodiment is applied. A substrate 1 shown in FIG. 1A is, for example, a substrate after CMP of a wiring layer. In the substrate 1, a wiring layer 20 is formed on a Low-k layer 30. A liner layer 10 is formed adjacent to the wiring layer 20, under the wiring layer 20. As shown in FIG. 1B, a barrier layer 11 may be formed adjacent to the liner layer 10, under the liner layer 10.

In the substrate 1, the first metal atom-containing layer may be either the liner layer 10 or the wiring layer 20. In a case where the first metal atom-containing layer is the liner layer 10, the second metal atom-containing layer serves as the wiring layer 20. In a case where the first metal atom-containing layer is the wiring layer 20, the second metal atom-containing layer serves as the liner layer 10.

In a case where the first metal atom-containing layer is the liner layer 10, the second metal atom-containing layer preferably contains copper. For example, the first metal atom-containing layer is the ruthenium containing liner layer 10 and the second metal atom-containing layer is the copper-containing wiring layer 20. In a case where a barrier layer 11 is provided, the barrier layer 11 may contain TiN or TaN. The first metal atom-containing layer may be barrier layer 11. In this case, the liner layer 10 may be omitted. For example, the first metal atom-containing layer may be a ruthenium-containing barrier layer.

In a case where the first metal atom-containing layer is the wiring layer 20, the second metal atom-containing layer preferably include TiN or TaN. For example, the first metal atom-containing layer is the wiring layer 20 made of ruthenium, and the second metal atom-containing layer is the liner layer 10 made of TiN or TaN.

In the substrate 1, the first metal atom-containing layer that includes ruthenium and the second metal atom-containing layer that includes a non-ruthenium metal are adjacent to each other to be exposed to the surface. In a case where the substrate 1 is cleaned with the cleaning liquid, a corrosion potential is generated in the metal due to a contact with the cleaning liquid. The ruthenium included in the first metal atom-containing layer has a high corrosion potential in a cleaning liquid in the related art, and a corrosion potential difference with that of the non-ruthenium metal included in the second metal atom-containing layer increases. As a result, galvanic corrosion occurs at an interface between the first metal atom-containing layer and the second metal atom-containing layer.

The galvanic corrosion is a phenomenon in which corrosion of one metal is accelerated in a case where different metals come into contact and conduct electrons in a corrosive environment such as an electrolytic solution. The galvanic corrosion results from the formation of a corrosion battery between two metals and the environment.

On the other hand, in the cleaning liquid of the present embodiment, the corrosion potential of ruthenium does not increase extremely, and a corrosion potential difference with that of the non-ruthenium metal is reduced. Therefore, even in a case where a substrate in which the first metal atom-containing layer and the second metal atom-containing layer are present adjacent to each other as in the substrate 1 is cleaned, the occurrence of galvanic corrosion is suppressed.

Figure 2A:
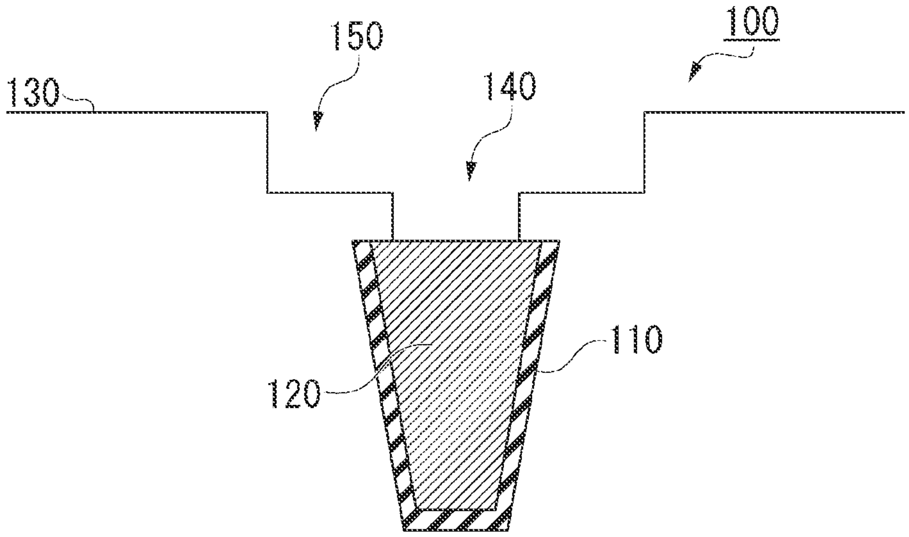
FIG. 2A shows an example of a substrate to which a cleaning liquid of one embodiment is applied.
Figure 2B:
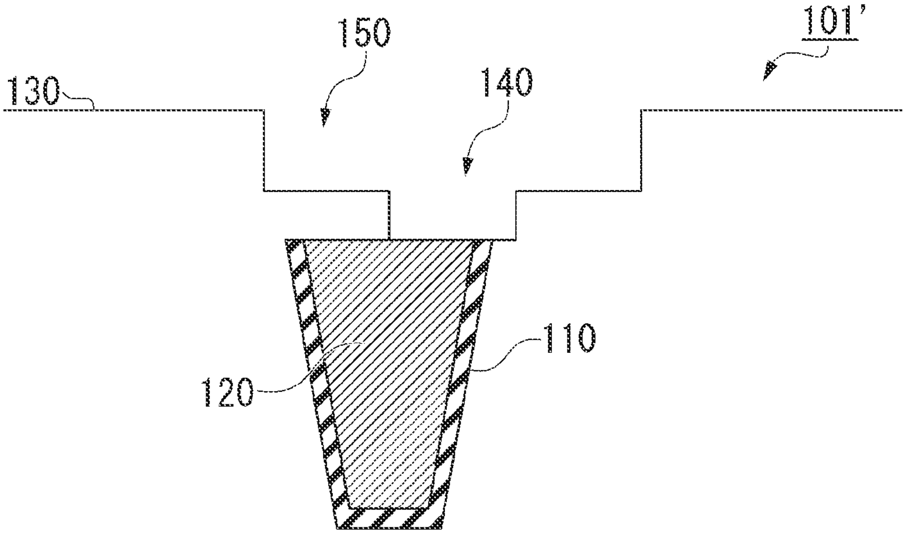
FIG. 2B shows an example of a substrate to which a cleaning liquid of one embodiment is applied.

FIGS. 2A and 2B are other examples of a substrate to which the cleaning liquid of the present embodiment is applied. A substrate 100 shown in FIG. 2 is a substrate after formation of a via 140 and a trench 150 connecting to a wiring layer 120 by, for example, a dual damascene process. The layer below a Low-k layer 130 forming the via 140 (the layer above a liner layer 110 adjacent to the wiring layer 120) may include an etch stop layer (not shown). In the substrate 100, the wiring layer 120 is formed on the Low-k layer 130. The liner layer 110 is formed adjacent to the wiring layer 120, under the wiring layer 120. A barrier layer may be formed adjacent to the liner layer 110 as a lower layer of the liner layer 110. The dual damascene is a method of performing embedding of a via and a groove (trench) simultaneously, in which the via and the groove are formed in advance, embedding of a metal is performed in the via and the groove simultaneously by film formation, and then an excess volume portion is removed by polishing.

In the substrate 100, the first metal atom-containing layer may be either the liner layer 110 or the wiring layer 120. In a case where the first metal atom-containing layer is the liner layer 110, the second metal atom-containing layer serves as the wiring layer 120. In a case where the first metal atom-containing layer is the wiring layer 120, the second metal atom-containing layer serves as the liner layer 110. Examples of a material for forming the liner layer 110 and the wiring layer 120 include the same materials as those for the substrate 1 in FIG. 1A. In a case where the substrate 100 has a barrier layer, the liner layer 110 may be omitted. Examples of a material for forming the barrier layer include the same materials as those for a substrate 1' in FIG. 1B.

In the substrate 100, the via 140 is formed on the wiring layer 120, the wiring layer 120 is exposed but the liner layer 110 is not exposed.

However, misalignment of the via may occur in a step of forming the via, and as in a substrate 100' shown in FIG. 2B, the liner layer 110 is formed in some cases. In a case where the liner layer 110 and the wiring layer 120 are exposed as in the substrate 100', galvanic corrosion occurs at an interface between the liner layer 110 and the wiring layer 120 due to a corrosion potential difference between ruthenium included in the first metal atomic layer and a non-ruthenium metal included in the second metal atomic layer by cleaning with a cleaning liquid in the related art. On the other hand, in the cleaning liquid of the present embodiment, the corrosion potential difference between ruthenium and a non-ruthenium metal is reduced, whereby the occurrence of galvanic corrosion is suppressed.

In the cleaning after via formation, there is a possibility that the liner layer 110 is exposed together with the wiring layer 120 due to an alignment deviation of the via. By using the cleaning liquid of the present embodiment, it is possible to suppress the occurrence of galvanic corrosion even in a case where there is an alignment deviation of the via.

Impurities such as metal shavings generated by these treatments adhere to the substrate after CMP or via formation. Such metal shavings include metals and metal oxides. For example, in a case where the substrate includes a copper wiring layer, the impurities include copper oxide (CuOx). These impurities can be efficiently removed from a substrate surface by using the cleaning liquid of the present embodiment.

According to the cleaning liquid of the present embodiment, by incorporation of the hydrazine compound (A) and the basic compound (B), it is possible to efficiently remove residues such as metals and/or metal oxides derived from the first metal atom-containing layer and the second metal atom-containing layer (residues generated in steps such as dry etching and CMP) while the occurrence of galvanic corrosion is suppressed even in the cleaning of a substrate in which ruthenium and a non-ruthenium metal are present in contact with each other. In the cleaning liquid of the present embodiment, an increase in the corrosion potential of ruthenium is suppressed and a corrosion potential difference between ruthenium and the non-ruthenium metal is reduced by the hydrazine compound (A). It is considered that this configuration suppresses the occurrence of galvanic corrosion. In addition, it is considered that by incorporation of the (B) component, the pH of the cleaning liquid is appropriately maintained and the cleanability for the residues (in particular, metal oxide residues) is improved.

(Second Aspect: Cleaning Liquid)

The cleaning liquid according to a second aspect of the present invention includes at least one hydrazine compound (A) selected from the group consisting of the compound represented by General Formula (a1), a hydrate of the compound, and a salt of the compound, and at least one basic compound (B) selected from the group consisting of an amine other than the hydrazine compound (A) and a quaternary hydroxide.

The cleaning liquid according to the present aspect is used for cleaning a substrate having a first metal atom-containing layer that contains a noble metal atom and a second metal atom-containing layer that contains a base metal atom, both the layers being present in contact with each other, where at least one of the first metal atom-containing layer and the second metal atom-containing layer is exposed on the surface.

The composition of the cleaning liquid of the present embodiment is the same as that of the cleaning liquid in the first aspect.

<Substrate>

The substrate to which the cleaning liquid of the present embodiment is applied is a substrate in which a first metal atom-containing layer that contains a noble metal atom and a second metal atom-containing layer that contains a base metal atom are present in contact with each other. In the substrate, at least one of the first metal atom-containing layer and the second metal atom-containing layer is exposed on the surface.

The first metal atom-containing layer contains a noble metal atom. As used herein, the noble metal means gold (Au), silver (Ag), platinum (Pt), palladium (Pd), rhodium (Rh), iridium (Ir), ruthenium (Ru), osmium (Os), and rhenium (Re). The noble metal atom contained in the first metal atom-containing layer may be a noble metal simple substance, a noble metal alloy, or a noble metal compound. Examples of the noble metal compound include a noble metal oxide, a noble metal nitride, and a noble metal oxynitride. The amount of the noble metal in the first metal atom-containing layer is preferably 20% by mass or more, more preferably 50% by mass or more, and still more preferably 80% by mass or more, and may be 100%, by mass with respect to the total mass of the composition forming the first metal atom-containing layer. The first metal atom-containing layer can be formed by a known method, and for example, CVD, ALD, or PVD can be used.

The second metal atom-containing layer contains a base metal atom. The base metal atom contained in the second metal atom-containing layer may be a base metal simple substance, a base metal alloy, or a base metal compound. Examples of the base metal compound include a base metal oxide, a base metal nitride, and a base metal oxynitride.

The substrate to which the cleaning liquid of the present embodiment is applied is the same as the substrate exemplified in the description of the cleaning liquid of the first aspect, except that the first metal atom-containing layer contains a noble metal atom and the second metal atom-containing layer contains a base metal atom.

In a case where the first metal atom-containing layer and the second metal atom-containing layer are present in contact with each other, by cleaning the substrate with a cleaning liquid in the related art, a corrosion potential of the noble metal increases and a corrosion potential difference with that of the base metal increases. As a result, galvanic corrosion occurs at an interface between the first metal atom-containing layer and the second metal atom-containing layer.

On the other hand, in the cleaning liquid of the present embodiment, the corrosion potential of the noble metal does not increase extremely, and a corrosion potential difference with that of the base metal is reduced. Therefore, even in a case where a substrate in which the metal atom-containing layer and the second metal atom-containing layer are present adjacent to each other as in the substrate 1 is cleaned, the occurrence of galvanic corrosion is suppressed.

According to the cleaning liquid of the present embodiment, by incorporation of the hydrazine compound (A) and the basic compound (B), it is possible to efficiently remove residues such as metals and/or metal oxides derived from the first metal atom-containing layer and the second metal atom-containing layer (residues generated in steps such as dry etching and CMP) while the occurrence of galvanic corrosion is suppressed even in the cleaning of a substrate in which a noble metal and a base metal are present in contact with each other. In the cleaning liquid of the present embodiment, an increase in the corrosion potential of noble metal is suppressed and a corrosion potential difference between the noble metal and the base metal is reduced by the hydrazine compound (A). It is considered that this configuration suppresses the occurrence of galvanic corrosion. In addition, it is considered that by incorporation of the (B) component, the pH of the cleaning liquid is appropriately maintained and the cleanability for the residues (in particular, metal oxide residues) is improved.

(Method for Cleaning Substrate: Third Aspect)

A method for cleaning a substrate according to a third aspect includes a step of cleaning a substrate using the cleaning liquid according to the first aspect. The substrate is a substrate in which a first metal atom-containing layer that contains a ruthenium atom and a second metal atom-containing layer that contains a metal atom other than ruthenium are present in contact with each other. In the substrate, at least one of the first metal atom-containing layer and the second metal atom-containing layer is exposed on the surface.

<Step of Cleaning Substrate: Cleaning Step>

The present step is a step of cleaning a substrate using the treatment liquid according to the first aspect. The present step includes an operation of bringing the cleaning liquid into contact with the substrate. A method for the cleaning method is not particularly limited, and a known cleaning method can be used. Examples of such the method include a method of continuously discharging a cleaning liquid onto a substrate rotating at a constant speed (single-wafer cleaning method), a method of immersing a substrate in a cleaning liquid for a certain period of time (dipping method), and a method of spraying a cleaning liquid onto a surface of a substrate (spray method).

The temperature at which the cleaning treatment is performed is not particularly limited. The temperature for the cleaning treatment is, for example, 15° C. to 60° C. By raising the temperature of the treatment liquid, the cleaning performance is improved, but the temperature of the cleaning liquid can be appropriately selected in consideration of suppression of a change in the composition of the cleaning liquid, workability, safety, cost, and the like.

As the cleaning time, a time sufficient for removing impurities, residues, and the like from a surface of the substrate can be appropriately selected. Examples of the cleaning time include 10 seconds to 30 minutes, 10 seconds to 15 minutes, 10 seconds to 10 seconds, or 10 seconds to 5 minutes.

The cleaning liquid according to the first aspect may be diluted 2- to 2,000-fold to obtain a diluted liquid at the time of use. In the present step, the substrate may be cleaned using the diluted liquid.

<Substrate>

Examples of a substrate to be cleaned include the same substrates as those described as a target to which the cleaning liquid according to the first aspect is applied. The substrate may be a substrate after CMP of the wiring layer (for example, FIG. 1). The substrate may be a substrate (for example, FIGS. 2A and 2B) after a via connected to wiring layers is formed by a dual damascene process.

<Optional Steps>

The method of the present embodiment may include optional steps in addition to the cleaning step. Examples of the optional steps include a CMP step, a via forming step, and a contact forming step.

(CMP Step)

The method of the present embodiment may include a CMP step before the cleaning step. The CMP step is a step of subjecting a substrate to a CMP treatment. By performing the CMP step, a surface of the substrate is planarized. The CMP step can be performed to planarize the wiring layer after forming the liner layer and the wiring layer on the substrate.

For example, a Low-k layer is formed on a substrate, and a trench and a via are formed on the Low-k layer. Next, a liner layer is formed, and then a wiring layer is formed. Then, the substrate surface is planarized by CMP. Shavings including oxides and the like of metals derived from the first and/or second metal atom-containing layers adhere to the substrate after CMP, but the shavings can be removed while the occurrence of galvanic corrosion is suppressed by performing the cleaning step.

(Via Forming Step)

The method of the present embodiment may include a via forming step prior to the cleaning step. A via can be formed, for example, so as to be connected to a wiring layer. Via formation may be performed in a dual damascene process.

For example, a Low-k layer is formed on a substrate in which a liner layer and a wiring layer are formed. An etch stop layer including SiCN, SiCO, $Al_2O_3$, or the like may be formed under the low-k layer. Next, a via is formed in the Low-k layer so as to be connected to the wiring layer. A via can be formed by, for example, dry etching or wet etching. Oxides and the like of metals derived from the first and/or second metal atom-containing layers, etching residues derived from the etch stop layer or the Low-k layer, and the like adhere to the substrate after via formation, but by performing the cleaning step, shavings (residues) can be removed while the occurrence of galvanic corrosion is suppressed.

In the via forming step, a trench may be formed along with the via. The cleaning step may be performed for the substrate after the via and the trench have been formed in the dual damascene process.

According to the method of the present embodiment, since the substrate is cleaned using the cleaning liquid according to the first aspect, a corrosion potential difference between the two metals can be reduced, the occurrence of galvanic corrosion can be suppressed, and good detergency can be maintained even in a case where ruthenium and a non-ruthenium metal are present adjacent to each other.

(Method for Cleaning Substrate: Fourth Aspect)

A method for cleaning a substrate according to a fourth aspect includes a step of cleaning a substrate using the cleaning liquid according to the second aspect. The substrate is a substrate in which a first metal atom-containing layer that contains a noble metal atom and a second metal atom-containing layer that contains a base metal atom are present in contact with each other. In the substrate, at least one of the first metal atom-containing layer and the second metal atom-containing layer is exposed on the surface.

<Step of Cleaning Substrate>

The present step is a step of cleaning a substrate using the treatment liquid according to the second aspect. The present step can be performed in the same manner as in the method for cleaning a substrate according to the third aspect.

<Optional Steps>

The method of the present embodiment may include optional steps in addition to the cleaning step. Examples of the optional steps include a CMP step, a via forming step, and a contact forming step. These methods can be performed in the same manner as the methods described in the method for cleaning a substrate according to the third aspect.

<Substrate>

Examples of a substrate to be cleaned include the same substrates as those described as a target to which the cleaning liquid according to the second aspect is applied. The substrate may be a substrate after CMP of the wiring layer (for example, FIG. 1). The substrate may be a substrate (for example, FIGS. 2A and 2B) after a via connected to a wiring layers is formed by a dual damascene process.

According to the method of the present embodiment, since the substrate is cleaned using the cleaning liquid according to the second aspect, a corrosion potential difference between the two metals can be reduced, the occurrence of galvanic corrosion can be suppressed, and good detergency can be maintained even in a case where a noble metal and a base metal are present adjacent to each other.

EXAMPLES

Hereinafter, the present invention will be described in more detail with reference to Examples, but the present invention is not limited to these examples.

<Preparation of Cleaning Liquid>

Examples 1 to 24 and Comparative Examples 1 to 5

Each component shown in Tables 1 to 3 was dissolved in water to prepare a cleaning liquid of each Example.

TABLE 1

| | (A) component | (B1) component | (B2) component | (C) component | (D) component | (E) component |
|---|---|---|---|---|---|---|
| Example 1 | (A)-1 [0.009] | (B1)-1 [0.3] | — | — | — | — |
| Example 2 | (A)-2 [0.001] | (B1)-1 [0.3] | — | — | — | — |
| Example 3 | (A)-3 [0.009] | (B1)-1 [0.3] | — | — | — | — |
| Example 4 | (A)-1 [0.009] | — | (B2)-1 [0.3] | — | — | — |
| Example 5 | (A)-1 [0.009] | — | (B2)-4 [0.3] | — | — | — |
| Example 6 | (A)-1 [0.009] | (B1)-5 [0.3] | — | — | — | — |
| Example 7 | (A)-1 [0.002] | (B1)-1 [0.3] | — | (C)-1 [0.1] | — | — |
| Example 8 | (A)-1 [0.009] | (B1)-1 [0.3] | — | (C)-1 [0.1] | — | — |
| Example 9 | (A)-1 [0.005] | (B1)-1 [0.3] | — | (C)-1 [0.1] | — | — |
| Example 10 | (A)-1 [0.009] | (B1)-1 [5] | — | — | — | — |
| Example 11 | (A)-1 [0.009] | (B1)-1 [0.3] | — | (C)-2 [0.1] | — | — |
| Example 12 | (A)-1 [0.009] | (B1)-4 [0.3] | — | (C)-1 [0.1] | — | — |
| Example 13 | (A)-2 [0.003] | (B1)-2 [0.3] (B1)-3 [0.1] | — | (C)-1 [0.2] | — | — |
| Example 14 | (A)-1 [0.009] | (B1)-1 [0.3] | (B2)-1 [0.1] | (C)-1 [0.1] | — | — |
| Example 15 | (A)-1 [0.009] | (B1)-1 [0.3] | (B2)-2 [0.1] | (C)-1 [0.1] | — | — |

TABLE 2

| | (A) component | (B1) component | (B2) component | (C) component | (D) component | (E) component |
|---|---|---|---|---|---|---|
| Example 16 | (A)-1 [0.009] | (B1)-1 [0.3] | (B2)-3 [0.1] | (C)-1 [0.1] | — | — |
| Example 17 | (A)-1 [0.009] | (B1)-1 [0.3] | (B2)-4 [0.1] | (C)-1 [0.1] | — | — |
| Example 18 | (A)-1 [0.009] | (B1)-1 [0.3] | — | (C)-1 [0.1] | (D)-1 [0.002] | — |
| Example 19 | (A)-1 [0.009] | (B1)-1 [0.3] | — | (C)-1 [0.1] | (D)-2 [0.001] | — |
| Example 20 | (A)-1 [0.009] | (B1)-1 [0.3] | — | (C)-1 [0.1] | (D)-3 [0.002] | — |
| Example 21 | (A)-1 [0.009] | (B1)-1 [0.3] | — | (C)-1 [0.1] | (D)-4 [0.002] | — |
| Example 22 | (A)-1 [0.009] | (B1)-1 [0.3] | — | (C)-1 [0.1] | — | (E)-1 [0.1] |
| Example 23 | (A)-1 [0.009] | (B1)-1 [0.4] | — | (C)-1 [0.1] | — | (E)-2 [0.1] |
| Example 24 | (A)-1 [0.009] | (B1)-1 [0.3] | — | (C)-1 [0.1] | — | (E)-3 [0.1] |

TABLE 3

| | (A) component | (B1) component | (B2) component | (C) component | (D) component | (E) component |
|---|---|---|---|---|---|---|
| Comparative Example 1 | — | (B1)-1 [0.3] | — | — | — | — |
| Comparative Example 2 | — | — | — | (C)-1 [0.1] | — | — |
| Comparative Example 3 | (A)-1 [0.1] | — | — | — | — | — |
| Comparative Example 4 | (A)-2 [0.1] | — | — | — | — | — |
| Comparative Example 5 | — | (B1)-1 [0.3] | — | (C)-1 [0.1] | — | — |

In Tables 1 to 3, each abbreviation has the following meaning. The numbers in brackets [ ] show % by mass with respect to the total mass of the cleaning liquid.

<Hydrazine Compound (A)>

(A)-1: 2-Hydrazinoethanol.

(A)-2: Hydrazine monohydrate.

(A)-3: t-Butylhydrazine hydrochloride.

(A)-1

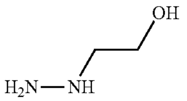

(A)-2

$H_2N—NH_2 \cdot H_2O$ (A)-3

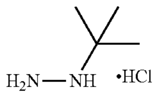

<Quaternary Hydroxide (B1)>

(B1)-1: Tetraethylammonium hydroxide (TEAH).

(B1)-2: Tetramethylammonium hydroxide (TMAH).

(B1)-3: Tris(2-hydroxyethyl)methylammonium hydroxide (THEMAH).

(B1)-4: Choline.

(B1)-5: Tetrabutylphosphonium hydroxide.

(B1)-1

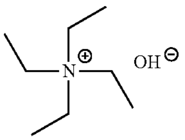

(B1)-2

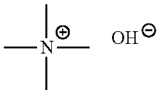

(B1)-3

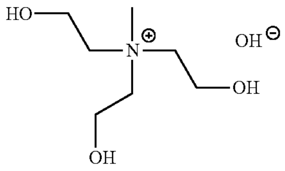

(B1)-4

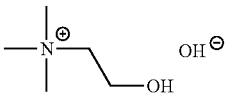

-continued (B1)-5

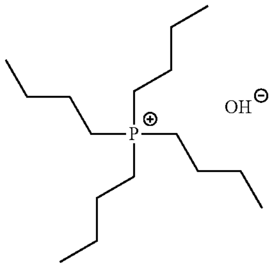

<Amine (B2)>

(B2)-1: Triethanolamine.

(B2)-2: Diethanolamine.

(B2)-3: Butylamine.

(B2)-4: Triethylamine.

(B2)-1

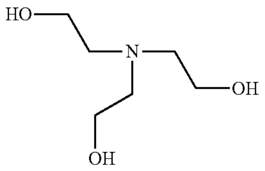

(B2)-2

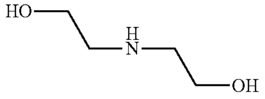

(B2)-3

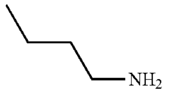

(B2)-4

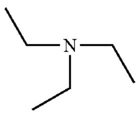

<Hydroxycarboxylic Acid (C)>

(C)-1: Citric acid.

(C)-2: Gluconic acid.

(C)-1

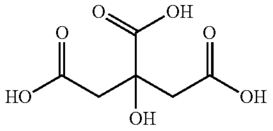

(C)-2

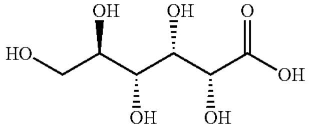

<Anticorrosive Agent (D)>

(D)-1: Triazole.

(D)-2: Benzotriazole (BTA).

(D)-3: Adenine.

(D)-4: 3-Amino-1,2,4-triazole.

(D)-1

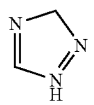

(D)-2

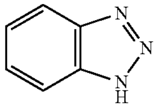

(D)-3

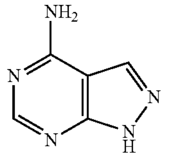

(D)-1

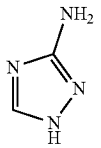

<Buffer (E)>

(E)-1: Bicine.

(E)-2: 2-Cyclohexylaminoethanesulfonic acid (CHES).

(E)-3: Tricine.

(E)-1

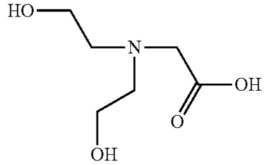

(E)-2

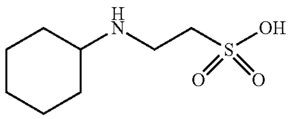

-continued (E)-3

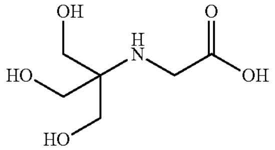

[Evaluation of Corrosion Potential Difference (ΔEcorr)]

A ruthenium film (60 nm) formed by a PVD method on a 12-inch silicon substrate or a copper film (30 nm) formed on an 8-inch silicon substrate by PVD was used as the substrate. Using a potentiostat (R600+ manufactured by GAMRY), a Tafel plot of the substrate in the cleaning liquid of each Example was measured to determine a corrosion potential (Ecorr). A reference electrode (Ag/AgCl), a counter electrode (Pt) and a working electrode (substrate) were used as the electrodes of the potentiostat. The corrosion potential difference (ΔEcorr) was calculated by the following equation.

$$\Delta E\text{corr} = (E\text{corr of copper substrate}) - (E\text{corr of ruthenium substrate})$$

Evaluation was performed according to the following evaluation standard, and the results are shown in Tables 4 to 6 as "Corrosion potential difference (ΔEcorr)".

Evaluation Standard:

A: −100 to 100 mV

B: More than 100 mV

C: Less than −100 mV

[Evaluation of Cleanability]

The cleanability was evaluated as an etching rate of CuOx. An 8-inch silicon substrate in which a copper film (30 nm) had been formed by PVD was used as the substrate. The substrate was immersed in a 5% by mass hydrogen peroxide solution and stirred at room temperature for 10 minutes. This treatment oxidized copper to copper oxide (CuOx). Then, the substrate was taken out, cleaned with water, and dried by blowing nitrogen. The cleaning treatment was performed using a coupon manufactured by cutting the substrate to 1.5×2 cm. A 200 mL beaker was filled with 100 mL of the cleaning liquid of each Example, and the coupon was immersed therein. Stirring was performed at room temperature and 300 rpm during immersion of the coupon. After performing the immersion for 3 minutes, the coupon was taken out, cleaned with water, and dried by blowing nitrogen.

The copper film thicknesses before the hydrogen peroxide treatment and after the cleaning treatment were measured by X-ray electron spectroscopy (XPS), using an X-ray electron spectrometer (Primus IV manufactured by Rigaku Corporation). The decrement amounts of the copper film thickness due to the cleaning treatment were calculated and shown in Tables 4 to 6 as a CuOx etching rate (A/min).

TABLE 4

| | Corrosion potential difference (ΔEcorr) | CuOx Etching rate (A/min) |
|---|---|---|
| Example 1 | A | 4 |
| Example 2 | A | 4 |
| Example 3 | A | 4 |
| Example 4 | A | 20 |
| Example 5 | A | 7 |
| Example 6 | A | 12 |
| Example 7 | A | 8 |

TABLE 4-continued

| | Corrosion potential difference (ΔEcorr) | CuOx Etching rate (A/min) |
|---|---|---|
| Example 8 | A | 8 |
| Example 9 | A | 19 |
| Example 10 | A | 12 |
| Example 11 | A | 9 |
| Example 12 | A | 12 |
| Example 13 | A | 13 |
| Example 14 | A | 12 |
| Example 15 | A | 16 |

TABLE 5

| | Corrosion potential difference (ΔEcorr) | CuOx Etching rate (A/min) |
|---|---|---|
| Example 16 | A | 14 |
| Example 17 | A | 13 |
| Example 18 | A | 2 |
| Example 19 | A | 6 |
| Example 20 | A | 6 |
| Example 21 | A | 5 |
| Example 22 | A | 19 |
| Example 23 | A | 8 |
| Example 24 | A | 15 |

TABLE 6

| | Corrosion potential difference (ΔEcorr) | CuOx Etching rate (A/min) |
|---|---|---|
| Comparative Example 1 | C | 1 |
| Comparative Example 2 | C | 125 |
| Comparative Example 3 | B | 13 |
| Comparative Example 4 | B | 15 |
| Comparative Example 5 | C | 3 |

From the results in Tables 4 to 6, it was confirmed that the cleaning liquids of Examples 1 to 24 sufficiently reduced the corrosion potential difference. On the other hand, the cleaning liquids of Comparative Examples 1 to 5 had a large corrosion potential difference.

It was confirmed that the cleaning liquids of Examples 1 to 24 also maintained the cleanability.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1,1',100,100': substrate
10,110: liner layer
11: barrier layer
20,120: wiring layer
30,130: Low-k layer
140: via
150: trench

What is claimed is:

1. A cleaning liquid for cleaning a substrate having a first metal atom-containing layer that contains ruthenium and a second metal atom-containing layer that contains a metal atom other than ruthenium, both the layers being present in contact with each other, where at least one of the first metal atom-containing layer and the second metal atom-containing layer is exposed on a surface, the cleaning liquid comprising:

at least one hydrazine compound (A) selected from the group consisting of a compound represented by General Formula (a1), a hydrate of the compound, and a salt of the compound; and at least one basic compound (B) which is a quaternary hydroxide, (a1)

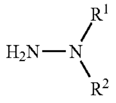

wherein $R^1$ and $R^2$ each independently represent an organic group including no carbonyl group or a hydrogen atom.

2. A cleaning liquid for cleaning a substrate having a first metal atom-containing layer that contains a noble metal atom and a second metal atom-containing layer that contains a base metal atom, both the layers being present in contact with each other, where at least one of the first metal atom-containing layer and the second metal atom-containing layer is exposed on a surface, the cleaning liquid comprising:

at least one hydrazine compound (A) selected from the group consisting of a compound represented by General Formula (a1), a hydrate of the compound, and a salt of the compound; and at least one basic compound (B) which is a quaternary hydroxide, (a1)

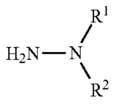

wherein $R^1$ and $R^2$ each independently represent an organic group including no carbonyl group or a hydrogen atom.

3. The cleaning liquid according to claim 1, further comprising a hydroxycarboxylic acid (C).

4. The cleaning liquid according to claim 1, wherein the hydrazine compound (A) has a concentration of 1.0% by mass or less with respect to a total mass of the cleaning liquid.

5. The cleaning liquid according to claim 1, wherein the basic compound (B) is at least one selected from the group consisting of a quaternary hydroxide, a tertiary monoamine, and a tertiary alkanolamine.

6. The cleaning liquid according to claim 1, further comprising at least one selected from the group consisting of a buffer, an anticorrosive agent, a surfactant, and an organic solvent.

7. The cleaning liquid according to claim 6, wherein the buffer is a compound with a pKa of 6 to 11.

8. A method for cleaning a substrate having a first metal atom-containing layer that contains a ruthenium atom and a second metal atom-containing layer that contains a metal atom other than ruthenium, both the layers being present in contact with each other, the method comprising cleaning a substrate where at least one of the first metal atom-containing layer and the second metal atom-containing layer is exposed on a surface, using the cleaning liquid according to claim 1.

9. A method for cleaning a substrate having a first metal atom-containing layer that contains a noble metal atom and a second metal atom-containing layer that contains a base metal atom, both the layers being present in contact with each other, the method comprising a step of cleaning a substrate where at least one of the first metal atom-containing layer and the second metal atom-containing layer is exposed on a surface, using the cleaning liquid according to claim 1.

10. The method for cleaning a substrate according to claim 8, wherein the substrate is a substrate after chemical mechanical polishing of a wiring layer, and the wiring layer is the first metal atom-containing layer or the second metal atom-containing layer.

11. The method for cleaning a substrate according to claim 8, wherein the first metal atom-containing layer is a ruthenium-containing barrier layer or a ruthenium-containing liner layer, and the second metal atom-containing layer is a copper-containing wiring layer.

12. The method for cleaning a substrate according to claim 11, wherein the substrate is a substrate after chemical mechanical polishing of the copper-containing wiring layer.

13. The cleaning liquid according to claim 1, wherein neither $R^1$ nor $R^2$ represents a linear or branched hydroxyalkyl group.

14. The cleaning liquid according to claim 1, wherein the at least one hydrazine compound (A) is selected from the group consisting of the hydrate of the compound represented by General Formula (a1) and the salt of the compound represented by General Formula (a1).

15. The cleaning liquid according to claim 2, wherein neither $R^1$ nor $R^2$ represents a linear or branched hydroxyalkyl group.

16. The cleaning liquid according to claim 2, wherein the at least one hydrazine compound (A) is selected from the group consisting of the hydrate of the compound represented by General Formula (a1) and the salt of the compound represented by General Formula (a1).

* * * * *